United States Patent
Cheng et al.

(10) Patent No.: US 9,958,729 B2
(45) Date of Patent: May 1, 2018

(54) DISPLAY PANEL AND DISPLAY APPARATUS (71) Applicant: BOE TECHNOLOGY GROUP CO., LTD., Beijing (CN)

(72) Inventors: Hongfei Cheng, Beijing (CN); Jianbo Xian, Beijing (CN); Yong Qiao, Beijing (CN); Yongchun Lu, Beijing (CN); Wenbo Li, Beijing (CN); Pan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 123 days.

(21) Appl. No.: 14/771,405

(22) PCT Filed: Apr. 20, 2015

(86) PCT No.: PCT/CN2015/076962
§ 371 (c)(1),
(2) Date: Aug. 28, 2015

(87) PCT Pub. No.: WO2016/058349
PCT Pub. Date: Apr. 21, 2016

(65) Prior Publication Data
US 2016/0370616 A1   Dec. 22, 2016

(30) Foreign Application Priority Data
Oct. 16, 2014   (CN) .................... 2014 2 0600416 U (51) Int. Cl.
*G02F 1/1337*   (2006.01)
*G02F 1/1335*   (2006.01)
(Continued)

(52) U.S. Cl.
CPC ........ *G02F 1/1337* (2013.01); *G02F 1/13439* (2013.01); *G02F 1/133514* (2013.01);
(Continued)

(58) Field of Classification Search
CPC ................... G02F 1/1337; G02F 1/133753
See application file for complete search history.

(56) References Cited

U.S. PATENT DOCUMENTS

| | | |
|---|---|---|
| 6,339,462 B1 | 1/2002 | Kishimoto et al. |
| 2003/0043336 A1 | 3/2003 | Sasaki et al. |

(Continued)

FOREIGN PATENT DOCUMENTS

| | | |
|---|---|---|
| CN | 102393589 A | 3/2012 |
| CN | 103226271 A | 7/2013 |

(Continued)

OTHER PUBLICATIONS

Third Office Action for Korean Application No. 10-2015-7023450, dated Jul. 28, 2017, 5 Pages.

(Continued)

*Primary Examiner* — Sang V Nguyen
(74) *Attorney, Agent, or Firm* — Brooks Kushman P.C.

(57) ABSTRACT

The display panel includes multiple sub-pixel areas, a first substrate and a second substrate oppositely arranged to form a cell; and a liquid crystal layer disposed between the first substrate and the second substrate. The second substrate includes a first sub-pixel electrode and a second sub-pixel electrode disposed in each of multiple areas respectively corresponding to the plurality of sub-pixel areas, a protruded object is disposed in a gap between the first sub-pixel electrode and the second sub-pixel electrode, which are adjacent to each other and are respectively included in different sub-pixel areas, and a projection of the protruded object at least partially overlaps an area of the liquid crystal layer corresponding to the gap.

16 Claims, 4 Drawing Sheets

(51) Int. Cl.
  *G02F 1/1343* (2006.01)
  *G02F 1/1362* (2006.01)
  *G02F 1/1368* (2006.01)
(52) U.S. Cl.
  CPC .. *G02F 1/133707* (2013.01); *G02F 1/133753* (2013.01); *G02F 1/134309* (2013.01); *G02F 1/136286* (2013.01); *G02F 1/1368* (2013.01); *G02F 2001/133776* (2013.01); *G02F 2001/134345* (2013.01); *G02F 2201/121* (2013.01); *G02F 2201/123* (2013.01)

(56) References Cited

U.S. PATENT DOCUMENTS

| | | | | |
|---|---|---|---|---|
| 2007/0188690 | A1* | 8/2007 | Ochiai | G02F 1/134363 349/129 |
| 2008/0316412 | A1* | 12/2008 | Lo | G02F 1/133707 349/143 |
| 2009/0086144 | A1* | 4/2009 | Chen | G02F 1/133707 349/141 |
| 2009/0147201 | A1* | 6/2009 | Yoshida | G02F 1/133707 349/129 |
| 2011/0128491 | A1* | 6/2011 | Kubota | G02F 1/133707 349/139 |
| 2013/0077031 | A1* | 3/2013 | Kim | G02F 1/13394 349/106 |
| 2013/0148048 | A1* | 6/2013 | Hiratsuka | G02F 1/1343 349/38 |
| 2013/0300993 | A1* | 11/2013 | Egami | G02F 1/134336 349/123 |
| 2014/0063390 | A1* | 3/2014 | Yonekura | G02F 1/136286 349/39 |
| 2014/0293199 | A1* | 10/2014 | Sakae | G02F 1/134363 349/106 |
| 2015/0062523 | A1* | 3/2015 | Furukawa | G02F 1/136213 349/143 |
| 2015/0098048 | A1* | 4/2015 | Tomioka | G02F 1/133512 349/106 |
| 2015/0168793 | A1* | 6/2015 | Oh | G02F 1/133707 349/110 |
| 2016/0026050 | A1* | 1/2016 | Lin | G02F 1/136286 349/43 |

FOREIGN PATENT DOCUMENTS

| | | | |
|---|---|---|---|
| CN | 103645589 A | 3/2014 | |
| CN | 204166255 U | 2/2015 | |
| JP | 2000081623 A | 3/2000 | |
| JP | 2000-100985 A | 4/2000 | |
| JP | 2005300724 A | 10/2005 | |
| JP | 2012163978 A | 8/2012 | |
| JP | 2013-211327 | * 8/2013 | ........... G02F 1/1339 |
| JP | 2015-075606 | * 4/2015 | ........... G02F 1/1339 |
| KR | 1020060074551 A | 7/2006 | |
| KR | 10-2008-0038606 A | 5/2008 | |

OTHER PUBLICATIONS

Office Action in Korean Patent Application No. 10-2015-7023450, dated Dec. 28, 2016.
Office Action in Korean Patent Application No. 10-2015-7023450, dated Jun. 21, 2016.
International Search Report and Written Opinion in PCT International Application No. PCT/CN2015/076962, dated Jun. 26, 2015.

* cited by examiner

DISPLAY PANEL AND DISPLAY APPARATUS

CROSS-REFERENCE TO RELATED APPLICATIONS

This application is the U.S. National Phase of PCT Application No. PCT/CN2015/076962 filed on Apr. 20, 2015, which claims a priority to Chinese Patent Application No. 201420600416.2 filed on Oct. 16, 2014, the disclosures of which are incorporated in their entirety by reference herein.

TECHNICAL FIELD

The present invention relates to a display technology field, particularly relates to a display panel and a display apparatus.

BACKGROUND

Liquid crystal display technology is widely used in televisions, mobile phones, and public information display. The liquid crystal displays are mainly divided into twisted nematic type (abbreviated as TN), vertical-aligned type (abbreviated as VA), in-plane switching type (abbreviated as IPS). Among these types, the vertical-aligned type liquid crystal display has a high contrast ratio, and a wide viewing angle. Thus, vertical-aligned type liquid crystal display is widely used in liquid crystal display apparatuses having large sizes.

Figure 1:
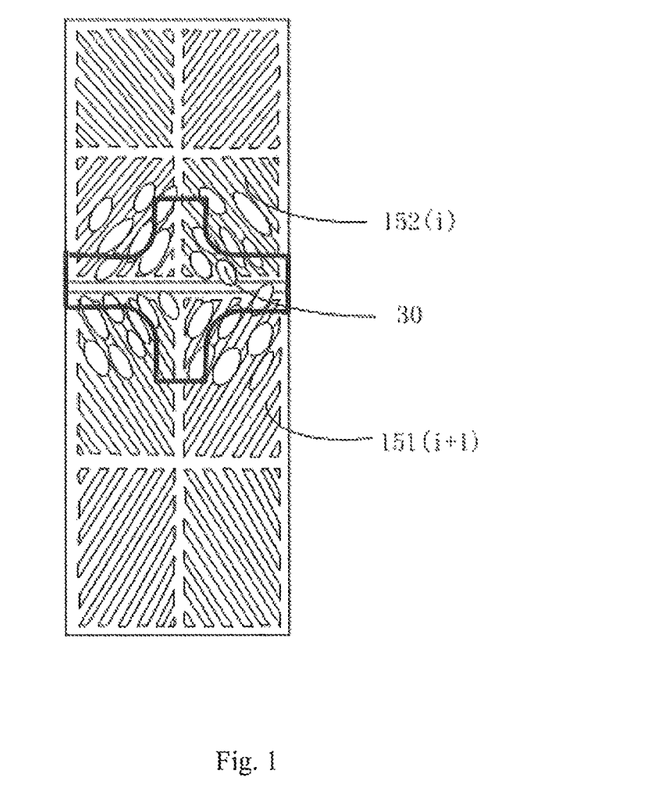
FIG. 1 is a schematic diagram showing an alignment of liquid crystal molecules in a display panel having eight-domain liquid crystal display type in a related art.

With a development of the display technology, multi-domain display technology is appeared in the vertical-aligned type technology field. In the multi-domain display technology, an alignment of the liquid crystal included in one sub-pixel area is divided into multiple domains under an application of an electric field. A luminance difference between the liquid crystals included in different domains compensates or counteract with each other in each angle direction. Thus, in each sub-pixel area, multi-domain liquid crystal display can be achieved and wide viewing angle can be provided. However, in the prior art, a gap exists between two sub-pixel electrodes, which are adjacent to each other and are included in respective two different sub-pixel areas, and crystal alignment directions are different in the vicinity of the gap. For example, as shown in FIG. 1, in the eight-domain liquid crystal alignment, a gap exists between two adjacent sub-pixel electrodes 152($i$) and 151($i$+1). In the vicinity of the gap, the liquid crystal alignment has dislocations and this may cause a dark area when being displayed. In FIG. 1, 152($i$) represents a second sub-pixel electrode corresponding to the gate line disposed in row i, and 151($i$+1) represents a first sub-pixel electrode corresponding to the gate line disposed in row i+1.

Thus, how to avoid the dislocation of the liquid crystal alignment in the gap area between two sub-pixel electrodes that are included in two adjacent sub-pixel areas, and therefore provide a display apparatus having no dark area during a display is a problem to be solved in the technology field of the current liquid crystal display.

SUMMARY

Regarding above-described technical problem existing in the prior art, the present invention provides a display panel and a display apparatus in which a protruded object is disposed in a gap between two sub-pixel electrodes adjacent to each other and respectively included in two different sub-pixel areas. Thus, dark area caused by the dislocation of the liquid crystal alignment in the vicinity of the gap can be restricted and the display performance can be improved.

A display panel is provided in order to solve the technical problem of the present invention. The display panel includes a plurality of sub-pixel areas; a first substrate and a second substrate oppositely arranged to form a cell; and a liquid crystal layer disposed between the first substrate and the second substrate, wherein the second substrate includes a first sub-pixel electrode and a second sub-pixel electrode disposed in an area corresponding to one of the plurality of sub-pixel areas, a protruded object is disposed in a gap between the first sub-pixel electrode and the second sub-pixel electrode, which are adjacent to each other and are respectively included in different sub-pixel areas, and a projection of the protruded object at least partially overlaps an area of the liquid crystal layer corresponding to the gap.

Optionally, the second substrate includes a plurality of gate lines and a plurality of data lines which are crossed and perpendicular to each other, the first sub-pixel electrode and the second sub-pixel electrode included in each of the plurality of sub-pixel areas are alternately disposed along an extension direction of each of the plurality of data lines, each of the plurality of gate lines passes through each of the sub-pixel areas, and the first sub-pixel electrode and second sub-pixel electrode included in each of the sub-pixel areas are respectively disposed on both sides of the gate line.

Optionally, each of the first sub-pixel electrode and the second sub-pixel electrode includes a slit and the slit, and an absolute value of an angle defined by the slit and the gate line is within a range of 30 to 60 degrees.

Optionally, the protruded object is symmetrical with respect to its center axis. The protruded object is disposed at a center of the gap between the first sub-pixel electrode and the second sub-pixel electrode, which are adjacent to each other and are respectively included in different sub-pixel areas. A center point of the projection of the protruded object onto the display panel coincides with a center point of the gap.

Optionally, the first substrate includes a base substrate, and a color filter layer, a protective layer, a common electrode layer, and an alignment layer sequentially arranged on the base substrate. The protruded object is disposed on the base substrate and the color filter layer covers the protruded object, or the protruded object is disposed on the color filter layer and the protective layer covers the protruded object, or the protruded object is disposed on the protective layer and the common electrode layer covers the protruded object, or the protruded object is disposed on the common electrode layer and the alignment layer covers the protruded object.

Optionally, the projection of the protruded object at least overlaps a center width area of the gap between the first sub-pixel electrode and the second sub-pixel electrode, which are adjacent to each other and are respectively included in different sub-pixel areas. A width of the gap is within a range from 3 μm to 10 μm, a maximum size of a projection of the protruded object onto the substrate is within a range from 15 μm to 30 μm.

Optionally, the protruded object has at least one of a rectangular parallelepiped shape, a tetrahedral shape, a wedge shape, a prism shape, a cubic shape, a cylinder shape or a hemisphere shape.

Optionally, a thickness of the liquid crystal layer is in a range from 3 μm to 6 μm and a height of the protruded object is in a range from 1 μm to 2 μm.

Optionally, the protruded object is made of photosensitive resin material and formed by a patterning process.

The present invention further provides a display apparatus including above-described display panel.

The present invention provides the following advantages. When eight-domain or sixteen-domain liquid crystal display is formed in the display panel, the protruded object is disposed in the gap between two adjacent sub-pixel electrodes included in two different sub-pixel areas of the first substrate. With this configuration, dislocation in alignment of the liquid crystal molecules in the vicinity of the gap between two adjacent sub-pixel electrodes can be avoided and black pixel areas caused by the liquid crystal molecule alignment dislocation in the vicinity of the gap can be restricted. Thus, a display performance can be improved.

REFERENCE NUMBER

1: array substrate;
10: first substrate;
11: gate line; 11($i$): i-th row of gate line; 11($i$+1): (i+1)-th row of gate line;
121: first data line; 122: second data line;
131: first common electrode line; 132: second common electrode line;
131($i$): i-th row of first common electrode line; 132($i$): i-th row of second common electrode line;
131($i$+1): (i+1)-th row of first common electrode line; 132 ($i$+1): (i+1)-th row of second common electrode line;
T1($i$): i-th row of first film transistor; T2($i$): i-th row of second film transistor;
T1($i$+1): (i+1)-th row of first film transistor; T2($i$+1): (i+1)-th row of second film transistor;
141: gate electrode; 142; gate insulation layer; 143: active layer; 144: source electrode;
145: drain electrode; 146: passivation layer;
151: first sub-pixel electrode; 152: second sub-pixel electrode;
151($i$): i-th row of first sub-pixel electrode; 152($i$): i-th row of second sub-pixel electrode;
151($i$+1): (i+1)-th row of first sub-pixel electrode; 152($i$+1): (i+1)-th row of second sub-pixel electrode;
2: color filter substrate; 20: second substrate; 21: color filter layer; 22: protective layer;
23: common electrode layer; 24: protruded object;
3: liquid crystal layer; 30: liquid crystal molecule.

DETAILED DESCRIPTION

The following will describe, in detail, a display panel and a display apparatus with reference to detailed embodiments and accompanying drawings so that a person skilled in the art can properly understand the present invention.

First Embodiment

Figure 2:
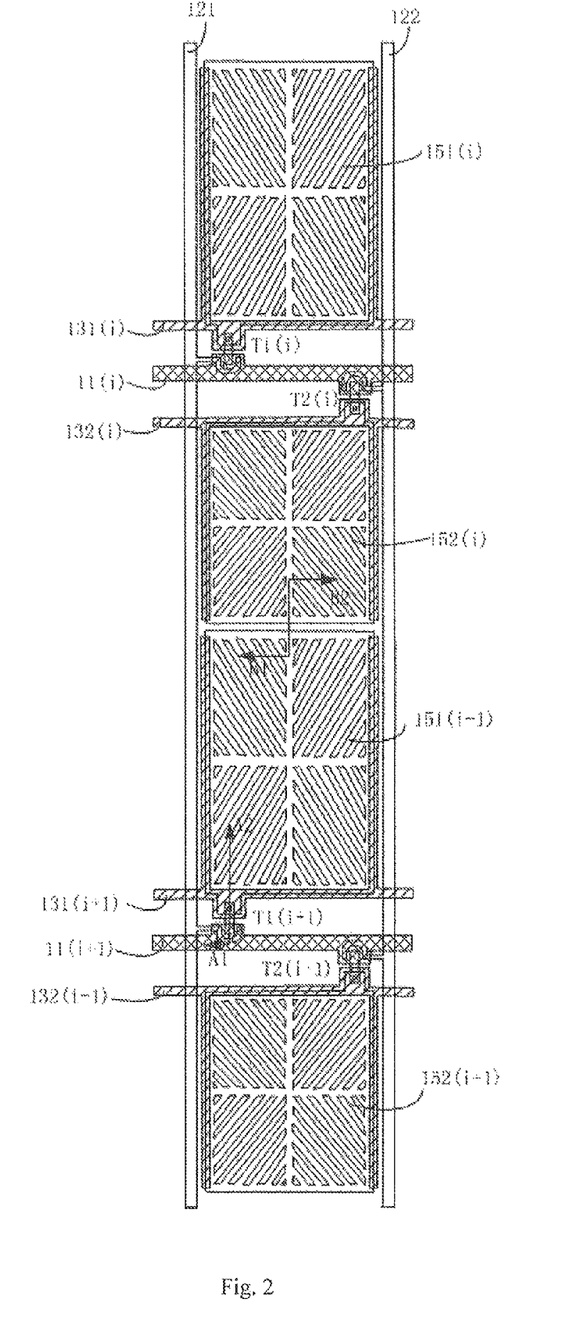
FIG. 2 is a plan view showing a display panel according to a first embodiment of the present invention when the display panel includes only an array substrate.
Figure 3:
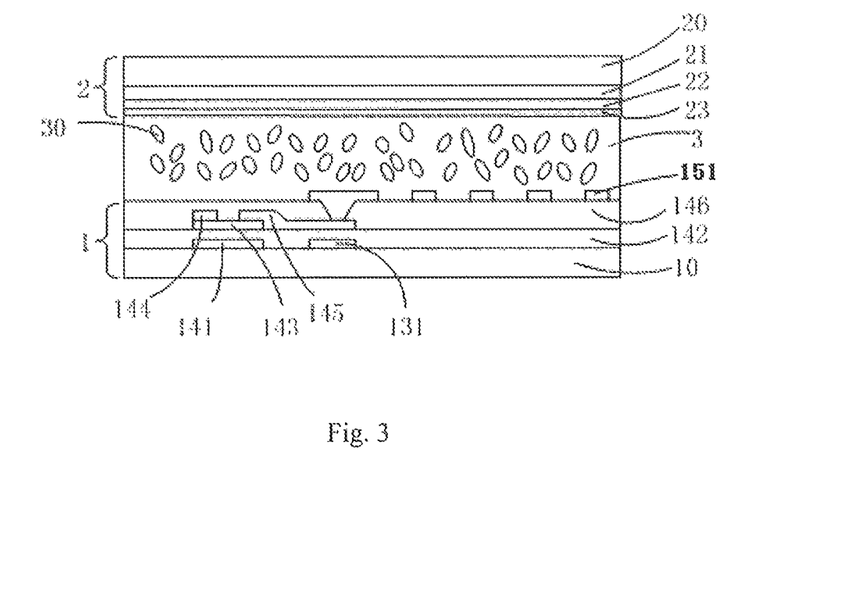
FIG. 3 is a sectional view of the display panel along line A1-A2 in FIG. 2.
Figure 4:
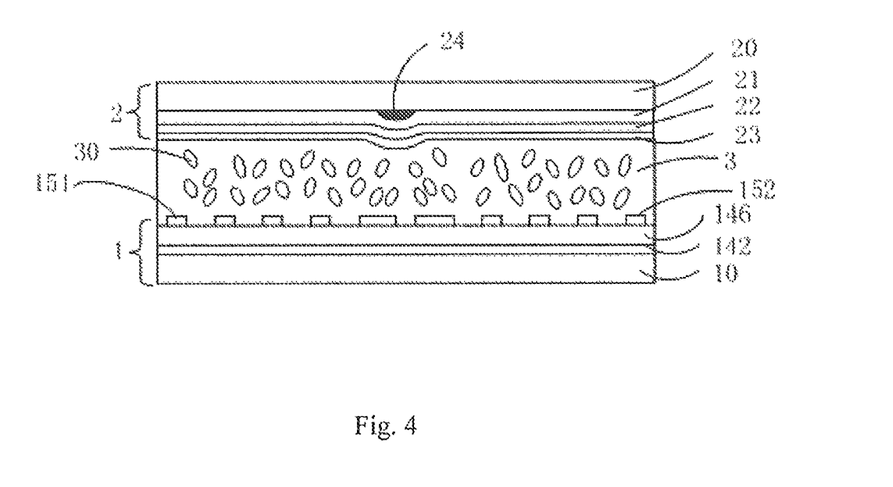
FIG. 4 is a sectional view of the display panel along line B1-B2 in FIG. 2.

The present embodiment provides a display panel. The display panel includes multiple sub-pixel areas. As shown in FIG. 2 to FIG. 4, the display panel includes a first substrate 2 and a second substrate 1 oppositely arranged to form a cell, and a liquid crystal layer 3 disposed between the first substrate 2 and the second substrate 1. The second substrate 1 includes a first sub-pixel electrode 151 and a second sub-pixel electrode 152 disposed in an area corresponding to one of the multiple sub-pixel areas. As shown in FIG. 4, a protruded object 24 is disposed in a gap between the first sub-pixel electrode 151 and the second sub-pixel electrode 152, which are adjacent to each other and are respectively included in different sub-pixel areas. A projection of the protruded object 24 at least partially overlaps an area of the liquid crystal layer 3 corresponding to the gap. In this display panel, the protruded object 24 is disposed for adjusting an alignment of the liquid crystal molecules 30 in the liquid crystal layer 3, which is disposed in the vicinity of the gap between two adjacent sub-pixel electrodes. Thus, a dislocation of the liquid crystal molecules 30 in the vicinity of the gap is restricted, and therefore dark area of pixels can be restricted or avoided.

In the following description, the first substrate 2 is provided by a color filter substrate, and the second substrate 1 is provided by an array substrate as an example. In some cases, the color filter substrate and the array substrate may be combined together as a COA substrate.

As shown in FIG. 2, the array substrate 1 includes multiple gate lines 11 and multiple data lines crossed and perpendicular to each other. The first sub-pixel electrode 151 and the second sub-pixel electrode 152 included in each of the multiple sub-pixel areas are alternately disposed along an extension direction of each of the multiple data lines. Each of the multiple gate lines passes through each of the sub-pixel areas. The first sub-pixel electrode 151 and second sub-pixel electrode 152 included in each of the sub-pixel areas are respectively disposed on both sides of the gate line 11. Each of the first sub-pixel electrodes 151 and the second sub-pixel electrodes 152 includes a slit. As shown in FIG. 2, an absolute value of an angle defined by the slit and the gate line is within a range of 30 to 60 degrees. For example, an acute angle from the slit to the gate line 11 in a counter clockwise direction may be defined as a positive angle, and an acute angle from the slit to the gate line 11 in a clockwise direction may be defined as a negative angle.

In FIG. 2, the sub-pixel electrode corresponding to an i-th row of gate line 11($i$) includes the first sub-pixel electrode 151($i$) and the second sub-pixel electrode 152($i$). The first sub-pixel electrode 151($i$) and the second sub-pixel electrode 152($i$) are respectively disposed on both sides of the i-th row of gate line 11($i$). The sub-pixel electrode corresponding to an (i+1)-th row of gate line 11($i$+1) includes a first sub-pixel electrode 151($i$+1) and a second sub-pixel electrode 152($i$+1). The first sub-pixel electrode 151($i$+1) and the second sub-pixel electrode 152($i$+1) are respectively disposed on both sides of the (i+1)-th row of gate line 11($i$+1). As an example, the second sub-pixel electrode 152($i$) corresponding to the i-th row of gate line 11($i$) and the first sub-pixel electrode 151($i$+1) corresponding to the (i+1)-th row of gate line 11($i$+1) are adjacent to each other. The two sub-pixel electrodes are referred to as two adjacent sub-pixel electrodes included in two different sub-pixel areas.

In the display panel according to the present embodiment, the liquid crystal molecules 30 may be provided by a negative liquid crystal. The first sub-pixel electrode 151 and the second sub-pixel electrode 152 disposed in the same sub-pixel area make the liquid crystal molecules 30 in the corresponding sub-pixel area to form 2 liquid crystal domains having different alignment. Herein, $2^n$ indicates the number of the liquid crystal domains, and n is a nature number and $2 \leq n \leq 4$. That is, multi-domain liquid crystal display may include four-domain liquid crystal display, eight-domain liquid crystal display, and sixteen-domain liquid crystal display. In the displaying panel adopting the multi-domain liquid crystal display, the protruded object 24 is disposed in the color filter substrate 2. The protruded object 24 can improve the alignment of the liquid crystal molecules 30 in the vicinity of the gap between two adjacent first sub-pixel electrode 151 and the second sub-pixel electrode 152 respectively included in different sub-pixel areas. With this configuration, the dislocation of the liquid crystal molecules 30 in the gap is restricted, and therefore dark area of pixels is restricted or avoided.

As an example, when n=3, the display panel adopts eight-domain liquid crystal display. Each sub-pixel area forms two regions perpendicular to each other. In each of the two regions, the first sub-pixel electrode 151 and the second sub-pixel electrode 152 are disposed. The first sub-pixel electrode 151 and the second sub-pixel electrode 152 make the liquid crystal layer 3 in the sub-pixel area to form 8 different alignments, that is, eight-domain liquid crystal display.

In the display panel according to the present embodiment, the protruded object 24 has a center axis-symmetric shape (that is, the protruded object is symmetric with respect to a center axis of itself). The protruded object 24 is disposed at a center of the gap between the first sub-pixel electrode 151 and the second sub-pixel electrode 152, which are adjacent to each other and are respectively included in different sub-pixel areas. A center point of the projection of the protruded object 24 onto the display panel coincides with the center point of the gap. The color filter substrate 2 includes a second substrate 20, and a color filter layer 21, a protective layer 22, a common electrode layer 23, and an alignment layer (not shown in FIG. 3 and FIG. 4) sequentially arranged on the second substrate 20. The projection of the protruded object 24 at least overlaps a center width area of the gap between the first sub-pixel electrode 151 and the second sub-pixel electrode 152, which are adjacent to each other and are included in different sub-pixel areas. A width area is a dimension of the gap formed along the data line between the first sub-pixel electrode 151 and the second sub-pixel electrode 152, which are adjacent to each other and are included in different sub-pixel areas. The center width area is a center area of the width area, which extends along the gate line (extension direction of the gate line is perpendicular to extension direction of the data line) in the corresponding gap. For example, a width of the gap between the first sub-pixel electrode 151 and the second sub-pixel electrode 152, which are adjacent to each other and are included in different sub-pixel areas, is within a range from 3 μm to 10 μm. A maximum size of a projection of the protruded object 24 on the second substrate 20 is within a range from 15 μm to 30 μm.

The position of the protruded object 24 in the display panel is not limited. In an actual manufacturing process of the display panel, the position of the protruded object 24 may be properly selected according to the client's needs or display accuracy. For example, the protruded object 24 may be disposed on the second substrate 20 and the color filter layer 21 covers the protruded object 24. Alternatively, the protruded object 24 may be disposed on the color filter layer 21 and the protective layer 22 covers the protruded object 24. Alternatively, the protruded object 24 may be disposed on the protective layer 22 and the common electrode layer 23 covers the protruded object 24. Alternatively, the protruded object 24 may be disposed on the common electrode layer 23 and the alignment layer covers the protruded object 24.

In the display panel according to the present embodiment, a shape of the protruded object 24 is also not limited. The protruded object 24 may have at least one of a rectangular parallelepiped shape, a tetrahedral shape, a wedge shape, a prism shape, a cubic shape, a cylinder shape or a hemisphere shape. Optionally, a projection of the protruded object 24 on the first substrate 10 may be a circle shape. That is, the shape of the protruded object 24 includes at least a circle-shaped part or an arc-shaped part for easy manufacturing of the protruded object 24.

A height of the protruded object 24 and a thickness of the liquid crystal layer maintain a predetermined relationship so that the protruded object 24 equalizes the alignment of the liquid crystal molecules in the liquid crystal layer 3 in a better manner. Thicker the liquid crystal layer 3 is, the higher of the protruded object 24 is. A thickness range of the liquid crystal layer 3 is 3 μm to 6 μm, and a height range of the protruded object 24 is 1 μm to 2 μm.

The protruded object 24 may be formed by a patterning process using photosensitive resin material. The patterning process may adopt exposure and developing process. The protruded object 24 may also be formed by a process for producing a predetermined pattern shape, such as printing or ink jet. The patterning process may be selected according to the configuration of the protruded object 24 formed in the present invention. In the display panel according to the present embodiment, the manufacturing process of the protruded object includes coating photosensitive material, exposing and developing the photosensitive material. With these processes, the protruded object 24 can be obtained.

In the display panel according to the present embodiment, each gate line 11 is disposed between the first sub-pixel electrode 151 and the second sub-pixel electrode 152 included in the same sub-pixel area, and is connected with a gate electrode of a first film transistor T1 and a gate electrode of a second film transistor T2, respectively. With this configuration, the first sub-pixel electrode 151 and the second sub-pixel electrode 152 are scanned and driven at the same time. Specifically, the first sub-pixel electrode 151($i$) corresponding to the i-th row of gate line 11($i$) is connected with the first data line 121 (connected with the source electrode of the first film transistor T1($i$)) via the drain electrode of the first film transistor T1($i$) corresponding to the i-th row of gate line 11($i$). The second sub-pixel electrode 152($i$) corresponding to the i-th row of gate line 11($i$) is connected with the second data line 122 (connected with the source electrode of the second film transistor T2($i$)) via the drain electrode of the second film transistor T2($i$) corresponding to the i-th row of gate line 11($i$). The first sub-pixel electrode 151($i$+1) corresponding to the (i+1)-th row of gate line 11($i$+1) is connected with the first data line 121 (connected with the source electrode of the first film transistor T1($i$+1)) via the drain electrode of the first film transistor T1($i$+1) corresponding to the (i+1)-th row of gate line 11(i+1). The second sub-pixel electrode 152(i+1) corresponding to the (i+1)-th row of gate line 11(i+1) is connected with the second data line 122 (connected with the source electrode of the second film transistor T2(i+1)) via the drain electrode of the second film transistor T2(i+1) corresponding to the (i+1)-th row of gate line 11(i+1). The data signal Va(i) on the first data line 121 is written to the first sub-pixel electrode 151(i) corresponding to the i-th row of gate line 11(i) via the source electrode of the first film transistor T1(i) corresponding to the i-th row of gate line 11(i). The data signal Vb(i) on the second data line 122 is written to the second sub-pixel electrode 152(i) corresponding to the i-th row of gate line 11(i) via the source electrode of the second film transistor T2(i) corresponding to the i-th row of gate line 11(i). The voltage Va(i) on the first sub-pixel electrode 151(i) corresponding to the i-th row of gate line 11(i) is different from the voltage Vb(i) on the second sub-pixel electrode 152(i) corresponding to the i-th row of gate line 11(i). A slope angle of the liquid crystal molecule on the first sub-pixel electrode 151(i) corresponding to the i-th row of gate line 11(i) is made different from a slope angle of the liquid crystal molecule on the second sub-pixel electrode 152(i) corresponding to the i-th row of gate line 11(i). In the present embodiment, as shown in FIG. 2, the liquid crystal molecules on the first sub-pixel electrode 151(i) corresponding to the i-th row of gate line 11(i) form a four-domain alignment, and the liquid crystal molecules on the second sub-pixel electrode 152(i) corresponding to the i-th row of gate line 11(i) form a four-domain alignment having different slope angle. Thus, the sub-pixel area corresponding to the i-th row of gate line 11(i) form eight-domain liquid crystal alignment. The data signal Va(i+1) on the first data line 121 is written to the first sub-pixel electrode 151(i+1) corresponding to the (i+1)-th row of gate line 11(i+1) via the source electrode of the first film transistor T1(i+1) corresponding to the (i+1)-th row of gate line 11(i+1). The data signal Vb(i+1) on the second data line 122 is written to the second sub-pixel electrode 152(i+1) corresponding to the (i+1)-th row of gate line 11(i+1) via the source electrode of the second film transistor T2(i+1) corresponding to the (i+1)-th row of gate line 11(i+1). Similarly, eight-domain liquid crystal alignment is formed in the sub-pixel area corresponding to the (i+1)-th row of gate line 11(i+1).

The following will describe a top-gate film transistor as an example. As shown in FIG. 3, the film transistor includes a gate electrode 141 (connected to the gate line formed on the same layer with the gate electrode 141 in FIG. 2), a gate insulation layer 142 disposed on the gate electrode 141, a active layer 143 disposed on the gate insulation layer 142, a source electrode 144 and a drain electrode 145 disposed in the same layer on the active layer 143, a passivation layer 146 disposed on the source electrode 144 and the drain electrode 145. The passivation layer 146 has a via hole (in FIG. 3, the via hole is filled with the material of the sub-pixel electrode, thus, is not indicated using a reference number). The sub-pixel electrode is connected with the drain electrode 145 via the via hole.

In the display panel according to the present embodiment, the array substrate 1 includes a common electrode line (formed in the same layer with the gate electrode 141). As shown in FIG. 2, the common electrode line includes a first common electrode line 131(i) corresponding to the i-th row of first sub-pixel electrode 151(i) and a second common electrode line 132(i) corresponding to the i-th row of second sub-pixel electrode 152(i). The first common electrode line 131(i) and the second common electrode line 132(i) are respectively disposed on both sides of the i-th row of gate line 11(i). The first common electrode line 131(i) includes a part forwarding the first sub-pixel electrode 151(i) and extending along the first data line 121 and the second data line 122. The part at least partially overlaps a projection of the first sub-pixel electrode 151(i). The first common electrode line 131(i) and the first sub-pixel electrode 151(i) corresponding to the i-th row form a storage capacitor Csta(i). The second common electrode line 132(i) includes a part forwarding the second sub-pixel electrode 152(i) and extending along the first data line 121 and the second data line 122. The part at least partially overlaps a projection of the second sub-pixel electrode 152(i). The second common electrode line 132(i) and the second sub-pixel electrode 152(i) corresponding to the i-th row form a storage capacitor Cstb(i). Similarly, corresponding first common electrode line 131(i+1) of the (i+1)-th row of first sub-pixel electrode 151(i+1) and corresponding first sub-pixel electrode 151(i+1) of the (i+1)-th row form the storage capacitor Csta(i+1), and corresponding common electrode line 152(i+1) of the (i+1)-th row of second sub-pixel electrode 152(i+1) and corresponding second sub-pixel electrode 152(i+1) of the (i+1)-th row form the storage capacitor Cstb(i+1).

Figure 5:
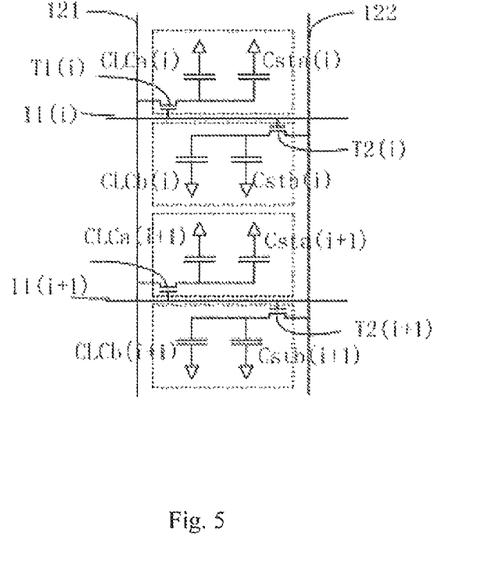
FIG. 5 is a circuit principle diagram of the display panel shown in FIG. 2.

A circuit principle diagram of the display panel according to the present embodiment is shown in FIG. 5. When the gate electrode 141 is scanned, the data signal Va(i) on the first data line 121 is written to the storage capacitor Csta(i) via the first film transistor T1(i) corresponding to the i-th row of gate line 11(i), and is written to the storage capacitor Csta(i+1) via the first film transistor T1(i+1) corresponding to the (i+1)-th row of gate line 11(i+1). The data signal Vb(i) on the second data line 122 is written to the storage capacitor Cstb(i) via the second film transistor T2(i) corresponding to the i-th row of gate line 11(i), and is written to the storage capacitor Cstb(i+1) via the second film transistor T2(i+1) corresponding to the (i+1)-th row of gate line 11(i+1). With this configuration, image display can be achieved.

In FIG. 5, CLCa(i) is a liquid crystal capacitor formed by the i-th row of first sub-pixel electrode 151(i) and the common electrode layer 23 on the color filter substrate 2, and CLCb(i) is a liquid crystal capacitor formed by the i-th row of second sub-pixel electrode 152(i) and the common electrode layer 23 on the color filter substrate 2, and CLCa(i+1) is a liquid crystal capacitor formed by the (i+1)-th row of first sub-pixel electrode 151(i+1) and the common electrode layer 23 on the color filter substrate 2, and CLCb(i+1) is a liquid crystal capacitor formed by the second sub-pixel electrode 152(i+1) and the common electrode layer 23 on the color filter substrate 2. The capacitance value of the liquid crystal capacitor is substantially smaller than the capacitance value of the storage capacitor. Thus, the liquid crystal capacitor can be omitted when discussing the display principle.

Figure 6:
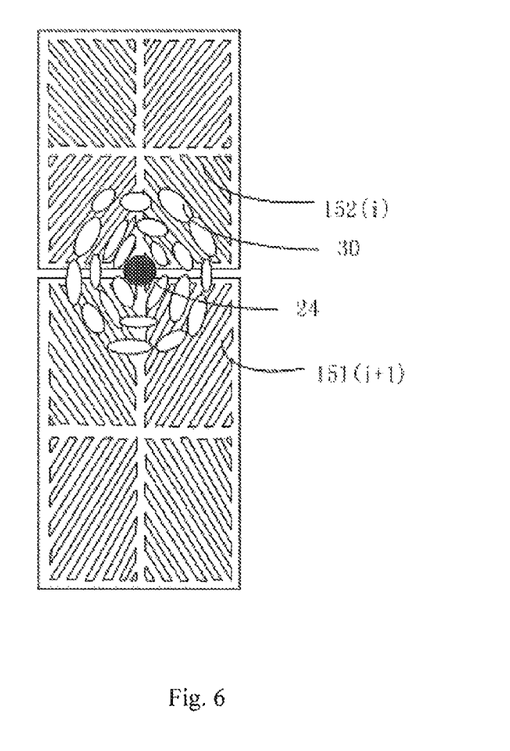
FIG. 6 is a diagram showing an alignment of liquid crystal molecules when the display panel shown in FIG. 2 employs an eight-domain liquid crystal display type.

FIG. 1 is a diagram showing an alignment of the liquid crystal molecule 30 in the vicinity of the gap between two adjacent sub-pixel electrodes included in different sub-pixel areas when the protruded object 24 is not disposed on the color filter substrate. In this case, a relatively large range of dark area may be appeared (a range shown by a bold line in FIG. 1), and this may adversely affect display performance, cause degradation in equal brightness, and cause a contrast ratio reduction and brightness reduction. As shown in FIG. 6, when the protruded object 24 is disposed on the color filter substrate 2, the alignment of the liquid crystal molecules in the vicinity of the gap between two adjacent sub-pixel electrodes included in different sub-pixel areas may be improved, and therefore restrict the dislocation of the liquid crystal molecules 30 in the vicinity of the gap. Thus, the dark area of pixels can be restricted or avoided.

In the display panel according to the present embodiment, the protruded object is disposed in the gap between two adjacent sub-pixel electrodes included in two different sub-pixel areas of the color filter substrate. Thus, the alignment of the liquid crystal molecules in the vicinity of the gap between sub-pixel electrodes can be improved, and therefore the dark area of pixels caused by the alignment of the liquid crystal molecules in the vicinity of the gap can be restricted and display performance can be improved.

Second Embodiment

The present embodiment further includes a display apparatus. The display apparatus includes the display panel according to the first embodiment.

The display apparatus may be provided by any one of a product or a device having a display function, such as a liquid crystal pad, electronic paper, mobile phone, tablet computer, television, monitor, notebook, digital album, navigation device.

The display panel included in the display apparatus adopts wide viewing angle supported multi-domain liquid crystal display technology. Further, the protruded object is disposed in the gap between two adjacent sub-pixel electrodes included in two different sub-pixel areas on the color filter substrate. Thus, the alignment of the liquid crystal molecules in the vicinity of the gap between two adjacent sub-pixel electrodes can be improved and dark area of pixels caused by the dislocation of the liquid crystal molecule alignment in the gap can be restricted. Thus, the display apparatus can provide a wider viewing angle range and an improved display performance.

The above are only embodiments of the disclosure. It is to be noted that, several modifications and improvements may be made by those skilled in the art without deviating from the principle of the disclosure, and these modifications and improvements shall also be considered as the scope of protection of the present disclosure.

What is claimed is:

1. A display panel comprising:
   a plurality of sub-pixel areas;
   a first substrate and a second substrate oppositely arranged to form a cell; and
   a liquid crystal layer disposed between the first substrate and the second substrate, wherein
   the second substrate includes a first sub-pixel electrode and a second sub-pixel electrode disposed in an area corresponding to one of the plurality of sub-pixel areas,
   a protruded object is disposed at a gap between the first sub-pixel electrode and the second sub-pixel electrode, which are adjacent to each other and are respectively included in different sub-pixel areas, a projection of the protruded object overlaps an area of the liquid crystal layer corresponding to the gap, and a width of the protruded object is larger than that of the gap,
   the second substrate includes a plurality of gate lines and a plurality of data lines which are crossed and perpendicular to each other,
   the first sub-pixel electrode and the second sub-pixel electrode included in each of the plurality of sub-pixel areas are alternately disposed along an extension direction of each of the plurality of data lines,
   each of the plurality of gate lines passes through a corresponding one sub-pixel area, and
   both the first sub-pixel electrode and second sub-pixel electrode included in the corresponding one sub-pixel area are connected to, and respectively disposed on both sides of, the corresponding gate line.

2. The display panel according to claim 1, wherein
   each of the first sub-pixel electrodes and the second sub-pixel electrodes includes a slit, and an absolute value of an angle defined by the slit and the gate line is within a range of 30 to 60 degrees.

3. The display panel according to claim 1, wherein
   the protruded object is symmetrical with respect to its center axis,
   the protruded object is disposed at a center of the gap between the first sub-pixel electrode and the second sub-pixel electrode, which are adjacent to each other and are respectively included in different sub-pixel areas, and
   a center point of the projection of the protruded object onto the display panel coincide with a center point of the gap.

4. The display panel according to claim 3, wherein
   the first substrate includes a base substrate, and a color filter layer, a protective layer, a common electrode layer, and an alignment layer sequentially arranged on the base substrate, wherein
   the protruded object is disposed on the base substrate and the color filter layer covers the protruded object, or
   the protruded object is disposed on the color filter layer and the protective layer covers the protruded object, or
   the protruded object is disposed on the protective layer and the common electrode layer covers the protruded object, or
   the protruded object is disposed on the common electrode layer and the alignment layer covers the protruded object.

5. The display panel according to claim 3, wherein
   the projection of the protruded object at least overlaps a center width area of the gap between the first sub-pixel electrode and the second sub-pixel electrode, which are adjacent to each other and are respectively included in different sub-pixel areas, and
   a width of the gap is within a range from 3 μm to 10 μm, a maximum size of a projection of the protruded object onto the base substrate is within a range from 15 μm to 30 μm.

6. The display panel according to claim 3, wherein
   the protruded object has at least one of a rectangular parallelepiped shape, a tetrahedral shape, a wedge shape, a prism shape, a cubic shape, a cylinder shape or a hemisphere shape.

7. The display panel according to claim 3, wherein
   a thickness of the liquid crystal layer is in a range from 3 μm to 6 μm and a height of the protruded object is in a range from 1 μm to 2 μm.

8. The display panel according to claim 1, wherein
   the protruded object is made of photosensitive resin material and formed by a patterning process.

9. A display apparatus comprising the display panel according to claim 1.

10. The display apparatus according to claim 9, wherein
    each of the first sub-pixel electrodes and the second sub-pixel electrodes includes a slit, and an absolute value of an angle defined by the slit and the gate line is within a range of 30 to 60 degrees.

11. The display apparatus according to claim 9, wherein
    the protruded object is symmetrical with respect to its center axis, the protruded object is disposed at a center of the gap between the first sub-pixel electrode and the second sub-pixel electrode, which are adjacent to each other and are respectively included in different sub-pixel areas, and a center point of the projection of the protruded object onto the display panel coincide with a center point of the gap.

12. The display apparatus according to claim 11, wherein the first substrate includes a base substrate, and a color filter layer, a protective layer, a common electrode layer, and an alignment layer sequentially arranged on the base substrate, wherein the protruded object is disposed on the base substrate and the color filter layer covers the protruded object, or the protruded object is disposed on the color filter layer and the protective layer covers the protruded object, or the protruded object is disposed on the protective layer and the common electrode layer covers the protruded object, or the protruded object is disposed on the common electrode layer and the alignment layer covers the protruded object.

13. The display apparatus according to claim 11, wherein the projection of the protruded object at least overlaps a center width area of the gap between the first sub-pixel electrode and the second sub-pixel electrode, which are adjacent to each other and are respectively included in different sub-pixel areas, and a width of the gap is within a range from 3 µm to 10 µm, a maximum size of a projection of the protruded object onto the base substrate is within a range from 15 µm to 30 µm.

14. The display apparatus according to claim 11, wherein the protruded object has at least one of a rectangular parallelepiped shape, a tetrahedral shape, a wedge shape, a prism shape, a cubic shape, a cylinder shape or a hemisphere shape.

15. The display apparatus according to claim 11, wherein a thickness of the liquid crystal layer is in a range from 3 µm to 6 µm and a height of the protruded object is in a range from 1 µm to 2 µm.

16. The display apparatus according to claim 9, wherein the protruded object is made of photosensitive resin material and formed by a patterning process.

* * * * *